UNITED STATES PATENT OFFICE.

ALFRED O. BLAICH, OF CHICAGO, ILLINOIS.

CASE-HARDENING COMPOUND.

1,100,008.

Specification of Letters Patent.

Patented June 16, 1914.

No Drawing.

Application filed October 18, 1913. Serial No. 795,872.

*To all whom it may concern:*

Be it known that I, ALFRED O. BLAICH, a citizen of the United States, residing at Chicago, in the county of Cook and State of Illinois, have invented new and useful Improvements in Case-Hardening Compounds, of which the following is a specification.

The purpose of this invention is to provide an improved mixture or compound for case-hardening, of which the basal element is tan bark.

It consists in the elements of the character hereinafter described and as indicated in the claims.

The basal element of the compound which constitutes this invention is tan bark, and inasmuch as the necessary carbon is present in the spent tan bark, commonly called "tan waste," which has a relatively low commercial value, it is preferred to use the tan bark in this cheaper form.

The tan bark or tan waste is first exposed to the process of drying to deprive it of its moisture to within five or ten per cent. The compound when completed in the manner hereinafter described comprises the tan bark or tan waste charred and having thoroughly mixed with it, and preferably being impregnated by, soda ash or common salt to the extent of about five per cent. by weight of the total mixture. Preferably, there is also comprised in the completed compound calcium carbonate in any of its commercial forms to the extent of about ten per cent. of the total mixture.

A very satisfactory compound is obtained by first charring the tan bark or tan waste (previously dried as above indicated), the same being reduced either before or after the charring to granular form, and preferably deprived of the dust which results from the process of crushing or grinding, and then mechanically mixing with the granular charred bark the five per cent. of the sodium salt and ten per cent. of calcium carbonate, the three elements being very thoroughly and evenly intermixed.

A preferred form of the compound is distinguished from that above described by having the charred bark impregnated with, and not merely intermixed with, the sodium salt and calcium carbonate. For producing this impregnation, the process consists in the following steps:—First, thoroughly intermixing the dried and granular bark with five per cent. of sodium salt and ten per cent. of calcium carbonate. Second, exposing the mixture in a retort which is liquid-sealed to a limited pressure and heated to a temperature adequate for fusing the sodium salt, which is about 1560° F., until the bark becomes charred and the sodium salt fused and absorbed by the charred bark. In this process the fused sodium salt seems to operate as a vehicle for carrying the calcium carbonate into the pores of the charred bark and cause it to adhere to the surface of the granules so that the charred bark is not only impregnated with the sodium salt and the calcium carbonate, but is further coated with the calcium carbonate.

The process of charring and impregnation may be performed in separate steps. The bark is first exposed in a liquid-sealed retort to the proper temperature for charring it, which is about 1400° F. After it is charred, it is mixed with the sodium salt and the calcium carbonate, and the mixture is again placed in a retort and exposed to a temperature of about 1560° F., since at this temperature the sodium salt becomes fused.

On account of economy, the process first described is preferred, but the result as to character of the product is the same.

The function of the calcium carbonate in this compound is to prevent the loss of part of the chemical elements of the sodium salt by volatilization in the process of charring or of subsequent heating for the impregnation described and in the use of the compound for case-hardening. It may be omitted without defeating, but with the result only of diminishing the efficiency of the compound for its purpose and requiring the use of a larger proportion of the sodium salt in the mixture before heating for impregnation.

I claim:—

1. A case-hardening compound comprising charred tan bark and a relatively small percentage of sodium salt thoroughly intermixed.

2. A case-hardening compound comprising charred tan waste and a relatively small percentage of sodium salt thoroughly intermixed.

3. A case-hardening compound comprising charred tan bark, about five per cent. of sodium salt and ten per cent. of calcium carbonate thoroughly intermixed.

4. A case-hardening compound comprising charred tan bark impregnated by infusion with a small percentage of sodium salt.

5. A case-hardening compound comprising charred tan bark impregnated by an infusion of about five per cent. sodium salt and ten per cent. calcium carbonate.

In testimony whereof, I have hereunto set my hand, at Chicago, Illinois, this 15th day of October, 1913.

ALFRED O. BLAICH.

Witnesses:
CHAS. S. BURTON,
LUCY I. STONE.